United States Patent [19]

Gurries

[11] 4,383,765
[45] May 17, 1983

[54] RESONANTLY-POWERED PLASTICIZER

[75] Inventor: Raymond A. Gurries, Reno, Nev.

[73] Assignee: Resonant Technology Company, Sparks, Nev.

[21] Appl. No.: 328,297

[22] Filed: Dec. 7, 1981

[51] Int. Cl.³ .............................................. B28C 7/04
[52] U.S. Cl. ..................................... 366/76; 366/118; 366/332
[58] Field of Search ....................... 366/69, 76, 78, 96, 366/100, 332, 333, 256, 257, 258, 259, 128, 108, 117, 118, 77, 184; 100/244; 425/206, 207, 558; 222/252, 262

[56] References Cited

U.S. PATENT DOCUMENTS 2,890,491 6/1959 Hendry ........................... 425/207 X
4,343,233 10/1982 Burgin ............................ 100/244 X Primary Examiner—Philip R. Coe
Assistant Examiner—Shewen Bian
Attorney, Agent, or Firm—Townsend and Townsend

[57] ABSTRACT

A plasticizer for melting raw plastic feed material and the like includes a pair of resonant beams horizontally mounted on a frame and having a plasticizing chamber defined between a pair of vertically aligned anti-nodes. A pair of pistons projecting from said anti-nodes define movable walls of the chamber which are vibrated by resonantly exciting the beams. Raw plastic feed material held within the chamber may be subjected to relatively high pressure, including a superimposed pressure component imparted by the vibration of the resonant beams. Such pressure and vibration act to melt the raw plastic feed material which may be discharged from the chamber by lowering the uppermost beam to evacuate the chamber.

9 Claims, 6 Drawing Figures

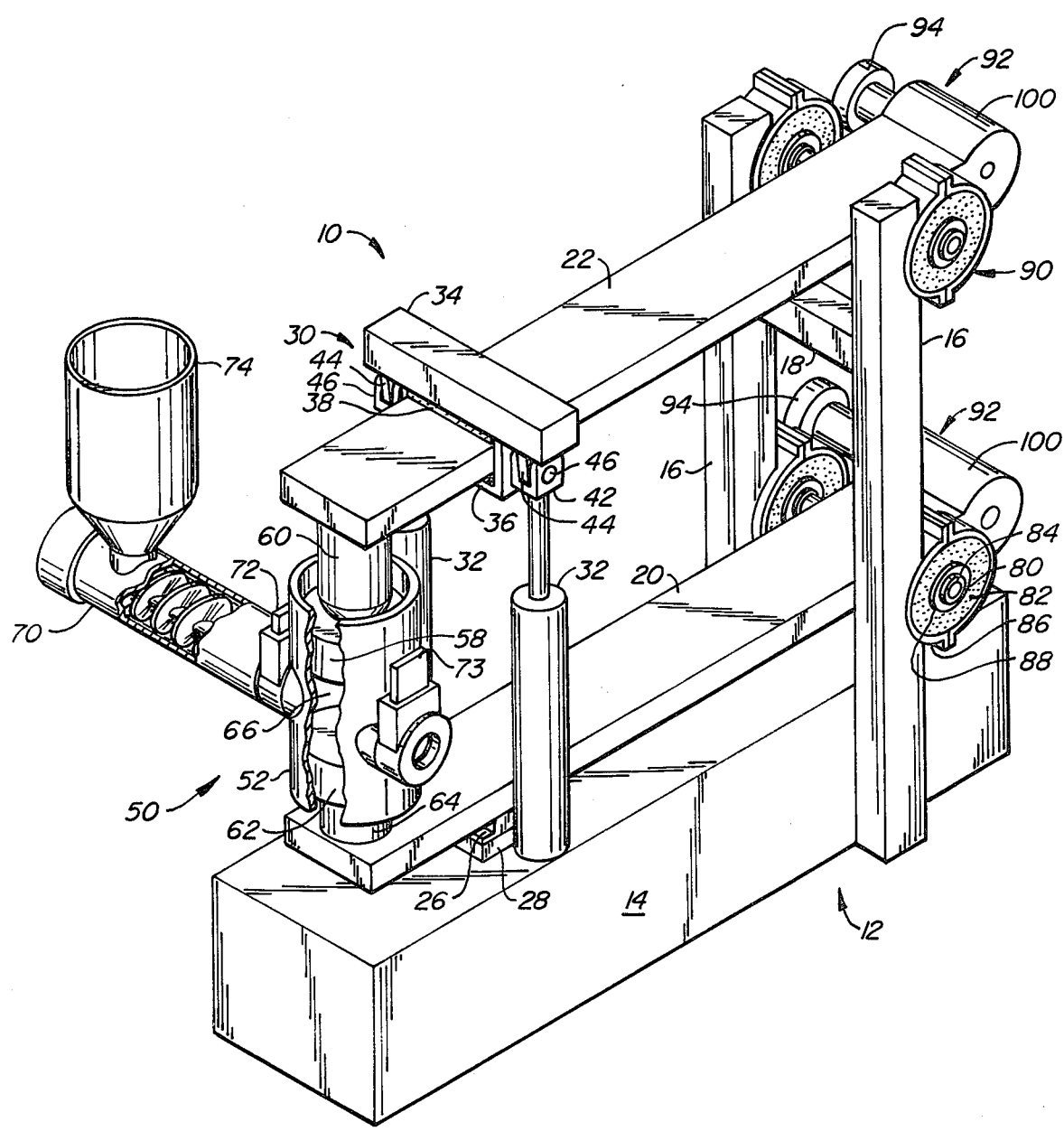
FIG.___1.

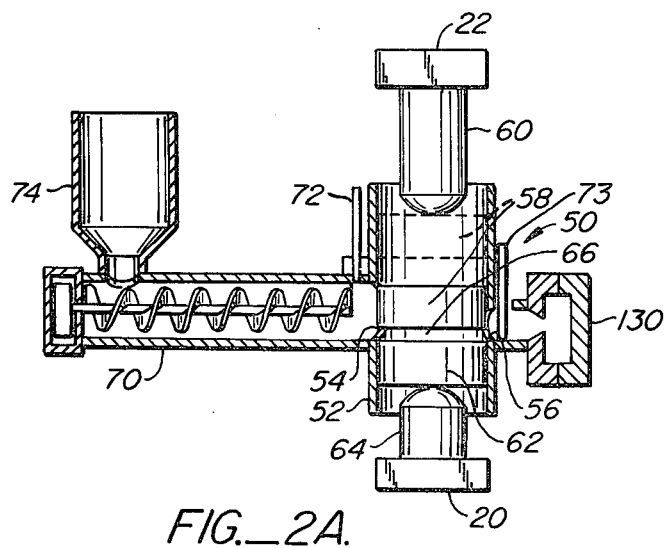
FIG._2A.
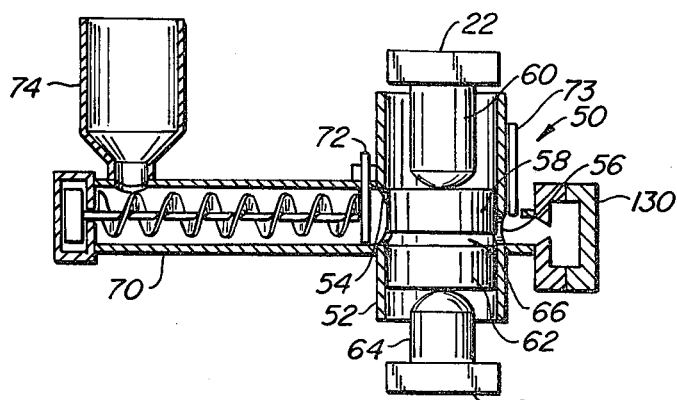
FIG._2B.
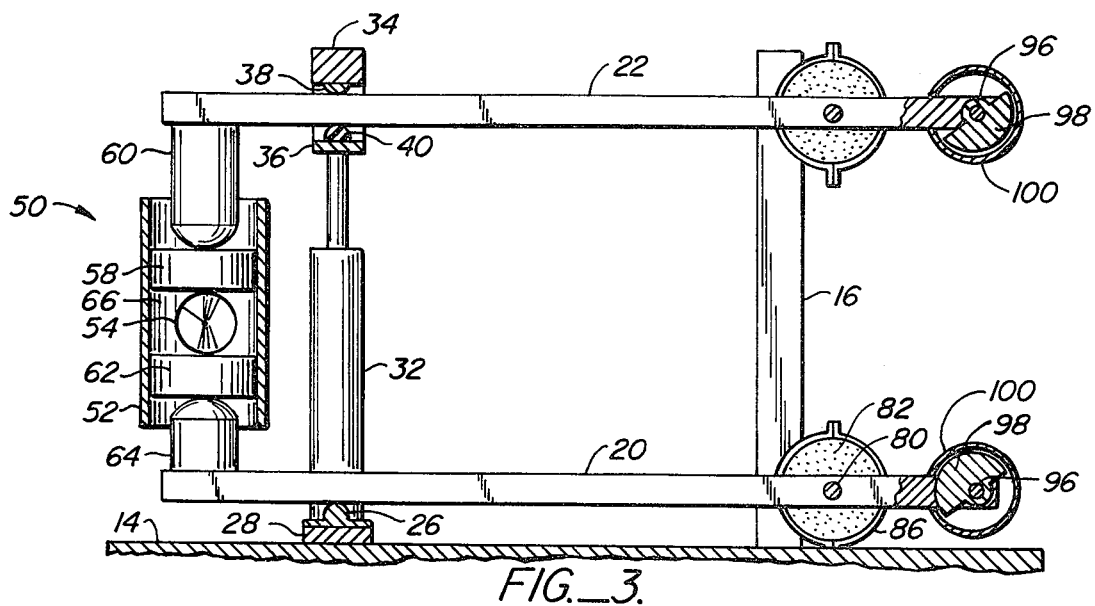
FIG._3.

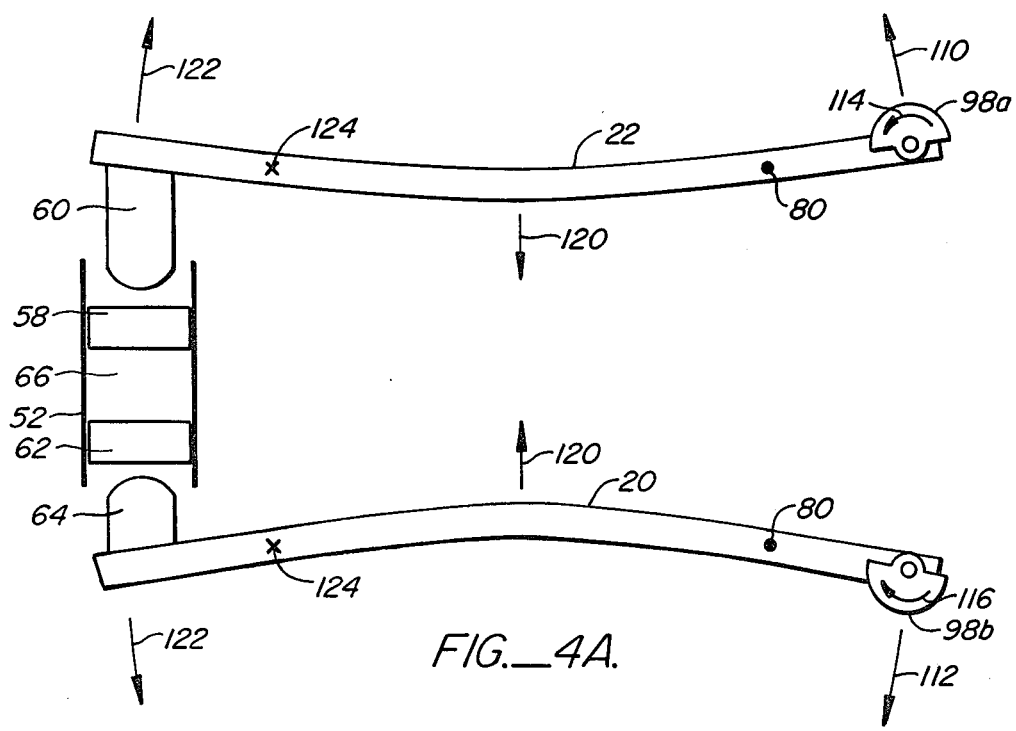
FIG._4A.
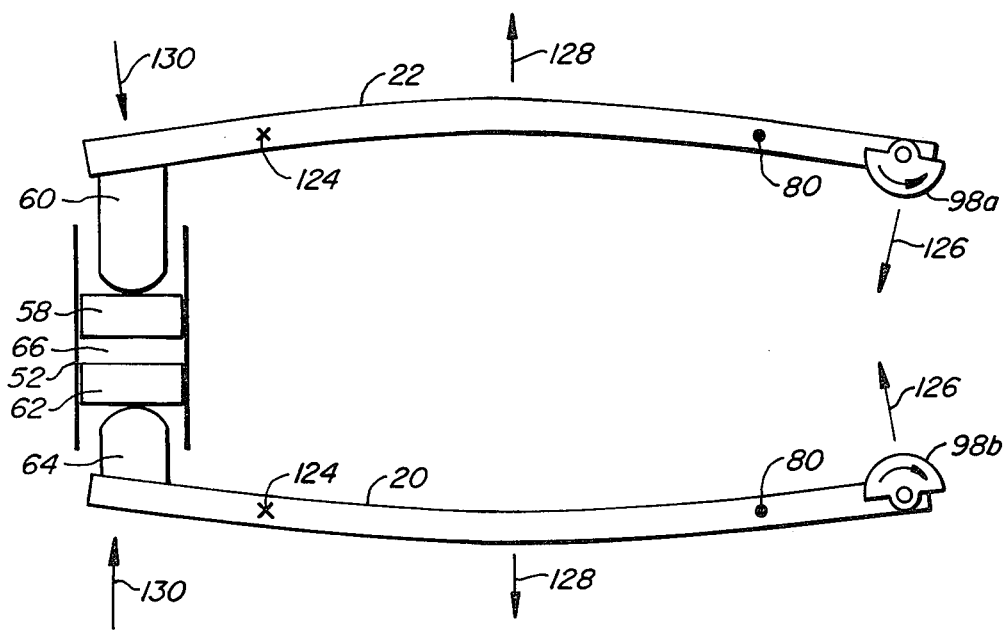
FIG._4B.

RESONANTLY-POWERED PLASTICIZER

BACKGROUND OF THE INVENTION

1. Field of the Invention

The present invention relates generally to plasticizers for melting solid plastic feed material prior to molding, blowing and the like. More particularly, it relates to a plasticizer having a chamber with opposed walls which are resonantly reciprocated to melt the plastic feed material by the application of pressure.

2. Description of the Prior Art

The most common method of melting solid plastic material prior to injection molding, blowing plastic film and the like is to pass solid plastic pellets or granules through a screw extruder where the plastic is melted by the combined friction and compression of the extruder. Often, heating elements are provided to complete the melting.

A more recent method is described in an article entitled "The Teledynamic Injection Molding Machine, A Non-Screw Injection Molding System" by Rossig and Walheim, KURSTOFFE 62, 541–43, Sept. 1972 and is referred to as high pressure plasticization. Solid plastic particles are advanced through a plasticizer or extruder by a plunger that is pulsating at a frequency of from 4 to 5 cycles per second while simultaneously applying a basal pressure of approximately 45,000 psi. High pressure plasticization may be carried out at a lower internal mass temperature and over a shorter time period than conventional screw injection plasticization avoiding thermal degradation of the mold mass and facilitating material flow through flow paths. Injection molded parts can be produced with less shrinkage and less strain.

Despite its advantages, high pressure plasticization has not been commercially successful. One reason for the lack of commercial success has been the general inability of the plasticizing machine, as described in the aforementioned article, to withstand the severe stress placed on its components by the large forces requires to produce the high pressure. The machine disclosed comprises plasticizing a chamber having a relatively small volume (in the range from 200 to 1,000 cc) and a plunger designed to reciprocate in the chamber. The plunger is driven directly by an eccentric drive unit which superimposes the pressure pulse over the basal pressure. The reaction forces and stresses generated by the drive system often damage the machine. It is thus desirable to provide a high pressure plasticizer which is relatively vibration free and which avoids the stress-associated problems of the prior art.

An additional shortcoming of the prior art is the limited volume available for the plasticizing chamber. The limited volume results from the need to maintain a relatively high ratio of the area to which pressure is applied to volume. Since it is also required to have a relatively small plunger area to apply the very high pressure spikes required for plasticization, it is necessary to limit the volume of the chamber. It is thus also desirable that a high pressure plasticizer having a relatively large plasticizing chamber be provided.

SUMMARY OF THE INVENTION

The present invention provides a high pressure plasticizer which is capable of operating with an acceptable level of vibration. It accomplishes this by providing a plasticizing chamber having a pair of reciprocal walls which are driven by pair of opposed resonant beams. By exciting the beams synchronously, but 180° out of phase, the walls reciprocate simultaneously inward to apply successive pressure waves through the plastic material fed therethrough. Moreover, by arranging the resonant beams horizontally and above and below the movable walls of the chamber, the weight of the upper beam provides the constant basal pressure necessary to melt the solid plastic material.

The resonant beams are supported at their nodes so that the oscillatory forces exciting the beams will not be transmitted to the frame. Moreover, the reaction force resulting from the impact of the anti-node of the beam on the plastic feed material is balanced by an equal but opposite force experienced by the opposite resonant beam since the beams are driven in an opposed manner, that is, 180° out of phase. Thus, the only portions of the plasticizer which experience stress are vertical support members which support the upper beam at a predetermined distance above the lower beam and define the volume of the plasticizing chamber. These vertical support members must absorb the reaction forces generated by the beams to prevent the beams from moving apart. Since the forces are balanced, however, the frame as a whole experiences little vibration and the problems associated with stress and fatigue found in the prior art plasticizer are avoided.

An additional advantage of the present invention results from the efficient transfer of energy arising from the use of a resonant system. Since a greater percent of the input energy is transferred to the material being plasticized, less energy is consumed by the plasticizer and more economic operation results.

In the preferred embodiment, a pair of resonant beams are mounted substantially horizontally on a frame and supported at their nodes spaced inward from the ends of the beams. The beams are arranged in an opposed manner, that is, the nodes and anti-nodes of each beam are vertically aligned. A pair of oscillatory drivers typically mounted at a pair of aligned anti-nodes, are driven synchronously, 180° out of phase, to induce a standing lateral wave in each beam.

A plasticizing chamber is located between another pair of vertically aligned anti-nodes tyically located at the one end of the beams, and includes a pair of reciprocal walls. The anti-nodes of the beams lie adjacent the walls and are attached thereto so that excitation of the resonant beams will cause the walls to vibrate at a like frequency.

Means for supporting the upper beam relative to the lower beam is provided. The means also serves to restrain the outward movement of both beams and to prevent the beams from moving apart as the walls engage the feed material. Such means will typically comprise a pair of hydraulic rams having the cylinder end connected to one beam and the rod end connected to the other beam.

In operation, a charge of feed material is introduced to the chamber, the chamber sealed and oscillation of the beams begun. The upper beam is gradually lowered with an increasing portion of its weight being supported by the plastic material. Thus, the pressure on the charge increases until the desired basal pressure is obtained. In addition to the basal pressure, the vibration of the beams causes pressure peaks to be experienced by the feed material. The combination of high pressure with pressure peaks provide the superior plasticization of the prior art, without the associated shortcomings of the apparatus of the prior art.

The novel features which are characteristic of the invention, as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the plasticizer of the present invention.

FIGS. 2A and 2B are front elevational views of a portion of the plasticizer shown in section.

FIG. 3 is a side elevational view of the plasticizer shown in section.

FIGS. 4A and 4B are schematic views of the resonant beams illustrating the movement induced by the oscillatory driver.

DESCRIPTION OF THE PREFERRED EMBODIMENT

Referring to FIG. 1, a plasticizer 10 includes a frame 12 comprising a base 14 and a pair of upright posts 16 joined by horizontal member 18. A pair of resonant beams 20,22 are each supported at one end on the posts 16, in a manner described in more detail hereinafter, and extend generally horizontally in a direction parallel to the base 14.

The lower beam 20 is supported at its end opposite the posts 16 on a resilient pad 26 (FIG. 3). The pad 26 is secured to the base 14 on a support plate 28. The opposite end of the upper beam 22 is secured in a support assembly 30 comprising a pair of hydraulic rod and cylinders 32, horizontal bar 34, bracket 36 and resilient pads 38 and 40 (FIG. 3). The hydraulic rod and cylinders 32 are rigidly secured to the base and project vertically upward therefrom. Each of the rods terminates in a clevis 42 which receives an ear 44 projecting downward from the horizontal bar 34 and attached thereto. The clevis 42 and ear 44 are rotatably attached by a pin 46 so that the horizontal bar 34 and bracket 36 are free to tilt about the horizontal axis defined between the aligned pins 46. The upper resonant beam 22 extends through an area defined by the bracket and the horizontal bar 34 and is held there between by the resilient pads 38,40.

A hydraulic system (not shown) is provided for a simultaneously actuating the rod and cylinders 32 in such a manner that the horizontal bar 34 is always maintained in a horizontal orientation. The upper resonant beam 22 will be raised and lowered during the operation of the plasticizer 10 in a manner described in more detail hereinafter. The rod and cylinders 32 also serve to absorb the reaction forces generated by the action of the resonant beams 20,22 on the plastic material.

Referring now to FIGS. 1, 2 and 3, a plasticizing chamber 50 is provided in the area between the distal ends of the resonant beams 20,22. The plasticizing chamber 50 comprises a vertical cylinder 52 having an inlet opening 54 and an outlet opening 56 formed through the cylindrical wall thereof. An upper hammer 60 extends downward from the distal end of beam 22 and is attached thereto. A piston 58 floats within the cylinder 52 and is free to move upward and downward, limited in the extent of downward travel by stops (not shown) secured to the inner wall of the cylinder.

The beam 22 and hammer 60 form a rigid assembly which moves up and down as the resonant beam 22 is vibrated. In this way, the hammer 60 periodically strikes the piston 58 to apply successive pressure pulses to the plastic material in the cylinder 52, as described hereinafter.

A lower hammer 64 is similarly joined to the lower resonant beam 20. The lower resonant beam 20 and hammer 64 also form a rigid unit which moves in unison as the lower beam is vibrated, the unit capable of striking a second floating piston 62. Together, the pistons 58 and 62 define a variable-volume chamber 66 within the plasticizing chamber 50. The volume of the chamber 66 depends on the elevation of the upper piston 58 above the lower piston 62, as will be described hereinafter.

A feed conveyor 70, typically a screw conveyor, is provided to transport plastic feed material to the plasticizing chamber 50. The feed conveyor 70 discharges into the inlet opening 54 and an inlet gate valve 72 and outlet gate valve 73 are provided to seal the chamber 66 when desired. A feed hopper 74 discharges into the feed conveyor 70. The hopper 74 may be a vibrating hopper to facilitate the transfer of the plastic pellet material. Such vibrating hoppers are well known in the prior art for transporting difficult to handle solids. The use of a screw conveyor as the feed conveyor 70 is preferred since the amount of plastic feed material can be accurately measured as it is discharged into the plasticizing chamber 50.

Lower resonant beam 20 is supported at its right most node (as viewed in FIG. 1) by a shaft 80 penetrating the beam 22 transversely along a line substantially coincident with said node. Shaft 80 is fixed to beam 20 and supported by resilient members 82 on opposite sides of the beam in order to isolate vibrations of the beam at the nodes from the surrounding frame. Typically, the resilient members 82 comprise a bearing 84 encased in a resilient ring of material, typically a pneumatic tire, which is housed within an outer casing 86. The casing 86 is rigidly secured to the post 16 at the desired elevation above the base 14. A retaining ring 88 secured at each end holds the shaft 80 in place. Identical shock absorbing mounts 90 are provided for the upper resonant beam 22.

Each resonant beam 20,22 includes an oscillatory driver 92 mounted at its rightmost end. The oscillatory driver 22 is adapted to impart reciprocating lateral forces at the anti-node of the associated resonant beam 20,22 so as to induce a standing lateral wave therein. The lateral forces required may be applied either at the rightmost, or at the middle anti-node, although it is more convenient to mount the driver 92 at the rightmost anti-node, as illustrated herein.

The oscillatory driver 92 includes a motor 94, typically a hydraulic motor, a shaft 96 (FIG. 3) driven by the motor, and one or more eccentric weights 98 mounted to rotate with the shaft 96. The eccentric weights are housed in an enclosure 100 formed about the rightmost end of the associated beam 20,22. The motors 94 are driven synchronously so that the weights 98 associated with each of the beams 20,22 will be driven synchronously, but 180° out-of-phase.

Referring now to FIGS. 4A and 4B, the operation of the oscillatory drivers 92 will be explained in detail. The eccentric weights 98 are driven synchronously but 180° out-of-phase by the associated oscillatory driver 92, as illustrated in both FIGS. 4A and 4B, and each weight exerts an outward centrifugal force as it rotates, which induces a standing lateral wave in the beam. The deformation experienced by each beam 20,22 has been exaggerated in FIGS. 4A and 4B.

Referring particularly to FIG. 4A, the weight 98a on beam 22 would be exerting a lateral force in the direction of arrow 110, while the weight 98b associated with beam 20 would be exerting a force in the opposite direction, as indicated by arrow 112. While the weights may be driven in either direction, for the purposes of illustration, the weight 98a on beam 22 is shown to rotate counterclockwise as indicated by arrow 114, while the weight 98b is shown to rotate clockwise, as indicated by arrow 116. Thus, FIG. 4A illustrates the weights 98 at the moment they are exerting the maximum outward lateral forces on the beams 20,22. The maximum lateral displacement will occur a short time later due to the inertia of the beams. In FIG. 4B, the weights 98 are illustrated at the moment they are exerting their maximum inward lateral force on the beams. Again, the maximum inward displacement will occur a short time after the maximum force has been imparted.

As the upward and downward forces applied to the anti-nodes of the beams 20,22 alternate, a lateral standing wave is induced in the associated beam. In FIG. 4A, as the rightmost, driven anti-node of each beam is moving outward, the middle anti-node is moving inward as illustrated by arrows 120. Similarly, the leftmost anti-nodes are moving outward as illustrated by arrows 122. The rightmost nodes (coincident with shaft 80) and the leftmost nodes (at 124), remain substantially stationary.

Referring now to FIG. 4B, the rightmost anti-nodes have moved inward, as illustrated by arrows 126, the middle anti-nodes have moved apart (arrows 128) and the left most antinodes have moved inward (arrows 130). This 'S'-shaped wave pattern is repeated at the frequency induced by the oscillatory drivers 92. Typically, the system will be driven at a frequency slightly below the free-ringing resonant frequency to avoid overdriving the system.

Referring now to FIGS. 2A and 2B, the operation of the plasticizer 10 will be described. The plastic feed material, typically in the form of pellets, is continually fed to the feed hopper 74, which acts as surge capacity for the system. Feed material from the hopper 74 is periodically conveyed to the plasticizing chamber 50 by the screw conveyor 70. This is accomplished while the upper resonant beam 22 is in its uppermost position, as illustrated in FIG. 2A. The gate valve 72 is opened and the screw conveyor 70 rotated for a sufficient number of revolutions to provide the desired amount of feed material to the plasticizing chamber 50. Feeding material into the chamber 50 causes the upper floating piston 58 to rise until its upper surface lies adjacent the hammer 60 (as shown in phantom in FIG. 2A). During the feeding operation, the discharge gate valve 73 will remain closed.

After the desired amount of feed material has entered the chamber 50, the inlet gate valve 72 is closed and vibration of the resonant beams 20, 22 is commenced. The weight of the upper beam 22 and the hammer 60 are increasingly supported by the plastic material within the chamber 50 as the beam is lowered. This weight, in turn, provides a constant basal pressure which contributes to the melting of the plastic material. The combined weight is chosen so that the pressure will be maintained at approximately 45,000 psi. The vibration of both the resonant beams 20,22, of course, superimposes an additional pressure component on the plastic feed material to complete the plasticization process. The magnitude of the superimposed pressure component depends on the driving force imparted to the beams as well as the amplitude of the pistons 58,62. The desired magnitude will depend on the characteristics of the plastic being processed. Typically, the vibrational amplitude will be in the range from $\frac{1}{8}$th to 1 inch.

After the feed material has been plasiticized, the outlet gate 73 is opened allowing the free-flowing plastic material to be discharged, typically into a mold such as 130. The plasticized material will be discharged from the chamber 50 by lowering the upper beam 22, which in turn moves piston 58 toward piston 62, decreasing the variable volume chamber 66. As the volume is decreased, the material is forced to flow outward, filling the mold 130.

After the chamber 66 has been evacuated, the discharge gate 73 is closed and the upper resonant beam 22 is raised. The chamber 50 is then ready to receive another charge of raw feed material.

While the preferred embodiment of the present invention is illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. An apparatus for plasticizing plastic feed material, said apparatus comprising:
   a supporting frame;
   a first resonant beam having anti-nodes at each end and nodes spaced inward from the ends;
   a second resonant beam having substantially similar dimensions and resonant characteristics as the first resonant beam;
   means for horizontally supporting the first and second resonant beams on the frame so that said beams lie in an opposed relationship with one beam above the other and with the nodes and anti-nodes aligned;
   a chamber mounted on the frame and substantially between an aligned pair of anti-nodes, said chamber having opposed walls located adjacent said aligned pair of anti-nodes; and
   means for inducing a lateral wave in each of the beams at or near its resonant frequency whereby the walls of the chamber are caused to periodically vibrate toward each other to plasticize the material therein.

2. An apparatus as in claim 1, wherein the means for horizontally supporting the beams further includes means for varying the distance between the beams so that pressure on the feed material in the chamber may be increased and so that the feed material may be expelled from the chamber.

3. An apparatus as in claim 1, further comprising an inlet means for feeding the plastic material to the chamber and outlet means for removing the plasticized charge from the chamber.

4. An apparatus as in claim 3, wherein said inlet means comprises a feed hopper and a screw conveyor for receiving a charge of feed material from the feed hopper and transferring said charge to the plasticizing chamber.

5. An apparatus as in claim 1, wherein the means for inducing a lateral wave is attached to the upper end of both beams, substantially at the upper anti-nodes thereof.

6. A plasticizer for melting particulate plastic feed material by the application of pressure, said plasticizer comprising:
   a chamber having opposed walls capable of translation substantially along a common perpendicular axis;
   means for feeding the particulate plastic material into the chamber;
   a first resonant beam having anti-nodes at each end and nodes spaced inward from the ends, said first resonant beam disposed to strike one of the opposed walls;
   a second resonant beam formed substantially the same as the first, being disposed to strike the other of the opposed walls;
   means for inducing a lateral wave in both of the resonant beams so that the anti-nodes are driven to strike the opposed walls of the chamber; and
   means for urging the beams together to shift the relative positions of the opposed walls to reduce the average volume of the chamber so that the plasticized material may be extruded therefrom.

7. A plasticizer as in claim 6, wherein the beams are located on opposite sides of the chamber with the first beam on top of the chamber so that the weight of the first beam contributes a constant basal pressure to the material in the chamber.

8. A plasticizer as in claim 6, wherein the means for feeding the particulate plastic material into the chamber comprises a feed hopper and a screw conveyor.

9. An apparatus as in claim 1 or 6, wherein the means for inducing a lateral wave includes:
   a motor;
   a first shaft operatively connected to the motor and received on the upper end of the first resonant beam;
   a second shaft operatively connected to the motor and received on the upper end of the second shaft; and
   at least one eccentric weight secured to each shaft so that rotation of the shafts by the motor causes the weights to rotate out-of-phase to induce synchronous, but opposite, lateral waves in the beams.

* * * * *